United States Patent [19]

Cannon

[11] Patent Number: 5,384,565
[45] Date of Patent: Jan. 24, 1995

[54] METHOD AND APPARATUS FOR IDENTIFYING DUPLICATE DATA MESSAGES IN A COMMUNICATION SYSTEM

[75] Inventor: Gregory L. Cannon, Coconut Creek, Fla.

[73] Assignee: Motorola, Inc., Schaumburg, Ill.

[21] Appl. No.: 923,637

[22] Filed: Aug. 3, 1992

[51] Int. Cl.$^6$ ............................................. H04Q 7/00
[52] U.S. Cl. ........................... 340/825.44; 340/825.48; 370/94.1
[58] Field of Search ...................... 340/825.44, 825.48, 340/311.1; 370/94.1

[56] References Cited

U.S. PATENT DOCUMENTS

| 4,814,763 | 3/1989 | Nelson et al. | 340/825.44 |
| 4,835,777 | 5/1989 | DeLuca et al. | 371/69 |
| 4,928,096 | 5/1990 | Leonardo et al. | 340/825.44 |
| 4,956,641 | 9/1990 | Matai et al. | 340/825.44 |
| 5,051,999 | 9/1991 | Erhart et al. | 371/41 |
| 5,159,331 | 10/1992 | Park et al. | 340/825.44 |
| 5,185,604 | 2/1993 | Nepple et al. | 340/825.44 |

FOREIGN PATENT DOCUMENTS

8971/1992  2/1992  Japan .

OTHER PUBLICATIONS

Stephen Wolfram, Mathematica, A System for Doing Mathematics by Computer, 2nd Edition, 3 pages (Cover, Pub Company and p. 49) dated 1991.

Primary Examiner—Donald J. Yusko
Assistant Examiner—Edward Merz
Attorney, Agent, or Firm—R. Louis Breeden; Thomas G. Berry

[57] ABSTRACT

A method (200) and apparatus (100, 402) are shown for determining whether first and second data messages in a communication system are duplicates. The method comprises forming (304) from the first and second data messages a corresponding pair of first and second message identifiers (120, 126). The identifiers (120, 126) comprise bits generated from first and second message characteristic values calculated (206) from portions (118, 124) of the first and second data messages. The method further comprises comparing 316 the first and second message identifiers (120, 126) to determine whether the first and second message identifiers (120, 126) are substantially equivalent to each other, substantially equivalent identifiers (120, 126) being indicative that the first and second data messages are duplicates.

20 Claims, 5 Drawing Sheets

METHOD AND APPARATUS FOR IDENTIFYING DUPLICATE DATA MESSAGES IN A COMMUNICATION SYSTEM

FIELD OF THE INVENTION

This invention relates in general to communication systems, and more specifically to a method and apparatus for detecting duplicate data messages in a communication system.

BACKGROUND OF THE INVENTION

Data messages transmitted in communication systems sometimes encounter conditions that cause reception errors. Such errors can be particularly troublesome in radio communication systems comprising portable receivers wherein a receiver may be carried temporarily into areas of poor reception. In one-way radio communication systems, e.g., a selective call messaging system, a technique that is used to provide higher reliability of message receipt is to transmit one or more duplicates of each message, the duplicates being offset in time from the time of an original transmission of each message.

While this technique does improve reliability of message receipt, it is accompanied by several drawbacks. Having to store one or more duplicates of each message within the limited memory of a selective call receiver wastes memory that may be needed for storing other messages. Having to display, read, and delete duplicate messages is bothersome to a user of the selective call receiver. For these reasons it is desirable for the selective call receiver to implement duplicate message identification and elimination.

Conventional duplicate message identification schemes are computationally intensive. Because messages are received with errors, the memory of the selective call receiver must store information about whether each portion of each received message was received in error. As message length increases, the amount of memory required to store error information increases in direct proportion. Conventional duplicate message identification schemes compare each non-errored portion of a first message with a corresponding non-errored portion of a second message. If all the non-errored portions match, then the messages are determined to be duplicates. Particularly for lengthy messages the processing requirements to perform the conventional duplicate message identification algorithm are considerable.

One method that could be helpful in performing duplicate message identification would be for the selective call messaging system to send a header with each message for identifying the message. The selective call receiver could then compare the header with the headers of other messages received to determine whether the message is a duplicate. If so, the duplicate message having the least errors could be retained and the other message discarded.

Unfortunately, using headers as a method for duplicate message identification also has drawbacks. The main drawback is that if the header is received in error, the method breaks down. Another drawback is that the air time required for sending the header uses system capacity that could otherwise be used for sending messages. Also, system-provided headers, while identifying duplicate messages that the system itself has generated, may not correctly identify as duplicates any duplicate messages that have been generated individually by a message sender.

Although the need to identify duplicate messages is often to eliminate all but one of the duplicates, there are times when it is desirable for a communication system to retransmit a specific duplicate message. For example, a message may have been received with numerous errors, and a user of the communication system may desire that an error-free copy be sent over a different, more error-free path such as a wire-line communication path. To request the system to retransmit a duplicate message, it is necessary to identify the message. Still, identifying a duplicate message to request a retransmission has all the aforementioned drawbacks associated with identifying a duplicate message to eliminate the message.

Thus, what is needed is a better duplicate message identification scheme. A duplicate message identification scheme is needed that is not computationally intensive and that does not require the receiver to store error information whose volume increases without limit in proportion to message length. Also, a duplicate message identification scheme that does not require the transmission of additional information, e.g., headers, from the selective call messaging system is desirable. Furthermore, a duplicate message identification scheme that intelligently detects duplicate messages based on the actual message contents, regardless of how the duplicate messages were generated is needed. A duplicate message identification method is needed also for identifying messages for retransmission in a retransmission request.

SUMMARY OF THE INVENTION

An aspect of the present invention is a method of determining whether first and second data messages are duplicates of one another in a communication system comprising a transmitter for sending the first and second data messages and a receiver for receiving the first and second data messages, wherein the method does not require transmission of a message identification header from the transmitter to the receiver. The method comprises the steps of:

(a) calculating from the first and second data messages a corresponding pair of first and second message identifiers comprising a plurality of bits generated from at least one corresponding pair of first and second message characteristic values, the at least one corresponding pair of first and second message characteristic values calculated from at least one portion of the first data message and a corresponding at least one portion of the second data message; and (b) comparing the pair of first and second message identifiers calculated in step (a) to determine whether the first and second message identifiers are substantially equivalent to each other, substantially equivalent identifiers being indicative that the first and second data messages are duplicates of one another.

Another aspect of the present invention is a method of requesting and obtaining a retransmission of a duplicate of a received data message in a communication system comprising a controller and transmitter for generating and transmitting the received data message, wherein the controller comprises memory means for storing a plurality of sent data messages and corresponding identification information calculated from each sent data message, the communication system further comprising a receiver for receiving the received data message and for providing information to the controller for requesting the retransmission. The method does not require transmission of a message identification header from the transmitter to the receiver. The method comprises:

in the receiver the steps of:
(a) calculating for the received data message a received message identifier comprising a plurality of bits generated from at least one characteristic value calculated from at least one portion of the received data message;
(b) calculating for the received data message a quality measure comprising a plurality of bits generated from at least one data quality rating calculated from the at least one portion of the received data message; and
(c) providing the received message identifier and the quality measure to the controller in a retransmission request; and in the controller the steps of:
(d) receiving the received message identifier and the quality measure in the retransmission request provided by the receiver in step (c);
(e) accessing the memory means to recover a sent message identifier calculated for a sent data message sent previously to the receiver, wherein the sent message identifier comprises a plurality of bits generated from at least one characteristic value calculated from at least one portion of the sent data message;
(f) comparing selected portions of the sent message identifier accessed in step (e) with corresponding selected portions of the received message identifier received in step (d), the quality measure received in step (d) indicating that the selected portions of the received message identifier were calculated from portions of the received data message having a data quality rating higher than a predetermined level;
(g) repeating steps (e) and (f) until all sent message identifiers contained in the memory means for data messages sent previously to the receiver have been accessed and compared, in response to the selected portions of the sent message identifier and the corresponding selected portions of the received message identifier being determined to be different from each other; and
(h) sending to the receiver a corresponding data message sent previously, in response to the selected portions of the sent message identifier and the corresponding selected portions of the received message identifier being determined to be substantially equivalent to each other.

A third aspect of the present invention is an apparatus in a receiver for determining whether first and second data messages are duplicates of one another in a communication system comprising a transmitter for sending the first and second data messages and the receiver for receiving the first and second data messages comprises a first processor element for calculating from the first and second data messages a corresponding pair of first and second message identifiers. No message identification header is required to be transmitted from the transmitter to the receiver. The identifiers comprise a plurality of bits generated from at least one corresponding pair of first and second message characteristic values, the at least one corresponding pair of first and second message characteristic values calculated from at least one portion of the first data message and a corresponding at least one portion of the second data message. The apparatus further comprises a second processor element coupled to the first processor element for comparing the pair of first and second message identifiers to determine whether the first and second message identifiers are substantially equivalent to each other, substantially equivalent identifiers being indicative that the first and second data messages are duplicates of one another. The apparatus further comprises a memory coupled to the first and second processor elements for storing at least one pair of first and second data messages and at least one corresponding pair of first and second message identifiers.

A fourth aspect of the present invention is a selective call receiver comprising a receiver for receiving radio frequency (RF) signals including information and for demodulating the RF signals to derive the information. The information is not required to include a message identification header. The selective call receiver further comprises a decoder coupled to the receiver for decoding the received information and obtaining data messages therefrom, and a microprocessor coupled to the decoder for accepting the data messages and for controlling the selective call receiver. The selective call receiver further comprises a memory coupled to the microprocessor for storing the data messages and operating system software, and apparatus for detecting and eliminating duplicate messages. The apparatus comprises a first processor element coupled to the memory for calculating an identifier for a data message received and an identifier for a selected one of a plurality of stored data messages. Each identifier comprises a plurality of bits generated from at least one characteristic value calculated from at least one portion of the data message received and from at least one corresponding portion of the selected one of the plurality of stored data messages. The apparatus further comprises a second processor element coupled to the first processor element for comparing the two identifiers, and a third processor element coupled to the second processor element for reducing the message received and the selected one of the plurality of stored data messages to a single message, in response to the two identifiers comprising substantially equivalent entireties.

A fifth aspect of the present invention is a controller for responding to a request for a retransmission of a duplicate of a received data message in a communication system comprising the controller for generating the received data message and a transmitter for transmitting the received data message. The communication system further comprises a selective call receiver for receiving the received data message and for providing information for requesting the retransmission. No message identification header is required to be transmitted from the transmitter to the selective call receiver. The controller comprises a processor for controlling the generation and transmission of a data message, and a first processor element coupled to the processor for calculating in response to a transmitted data message an identifier for the transmitted data message. The identifier comprises a plurality of bits generated from at least one characteristic value calculated from at least one portion of the transmitted data message. The controller further comprises a memory having a plurality of memory locations, each corresponding to a selective call receiver identification corresponding to a selective call receiver having been sent a transmitted data message. The plurality of memory locations are coupled to the processor for storing the transmitted data message and the corresponding transmitted message identifier. The controller further comprises a communications port coupled to the processor for receiving a selective call receiver identification, a received message identifier, and a quality measure in a request for a retransmission. In addition, the controller includes a second processor element coupled to the memory for accessing a memory location corresponding to a selective call receiver matching the selective call receiver identification to retrieve a transmitted message identifier calculated for a transmitted data message, and a third processor element coupled to the second processor element for comparing selected portions of the retrieved transmitted message identifier with corresponding selected portions of the received message identifier. The selected portions comprise portions corresponding to portions of the quality measure that have a data quality rating higher than a predetermined level. The controller also comprises a fourth processor element coupled to the third processor element and to the communications port for sending to the selective call receiver a corresponding transmitted data message, in response to the selected portions of the retrieved transmitted message identifier and the corresponding selected portions of the received message identifier being substantially equivalent to each other.

DESCRIPTION OF A PREFERRED EMBODIMENT

Figure 1:
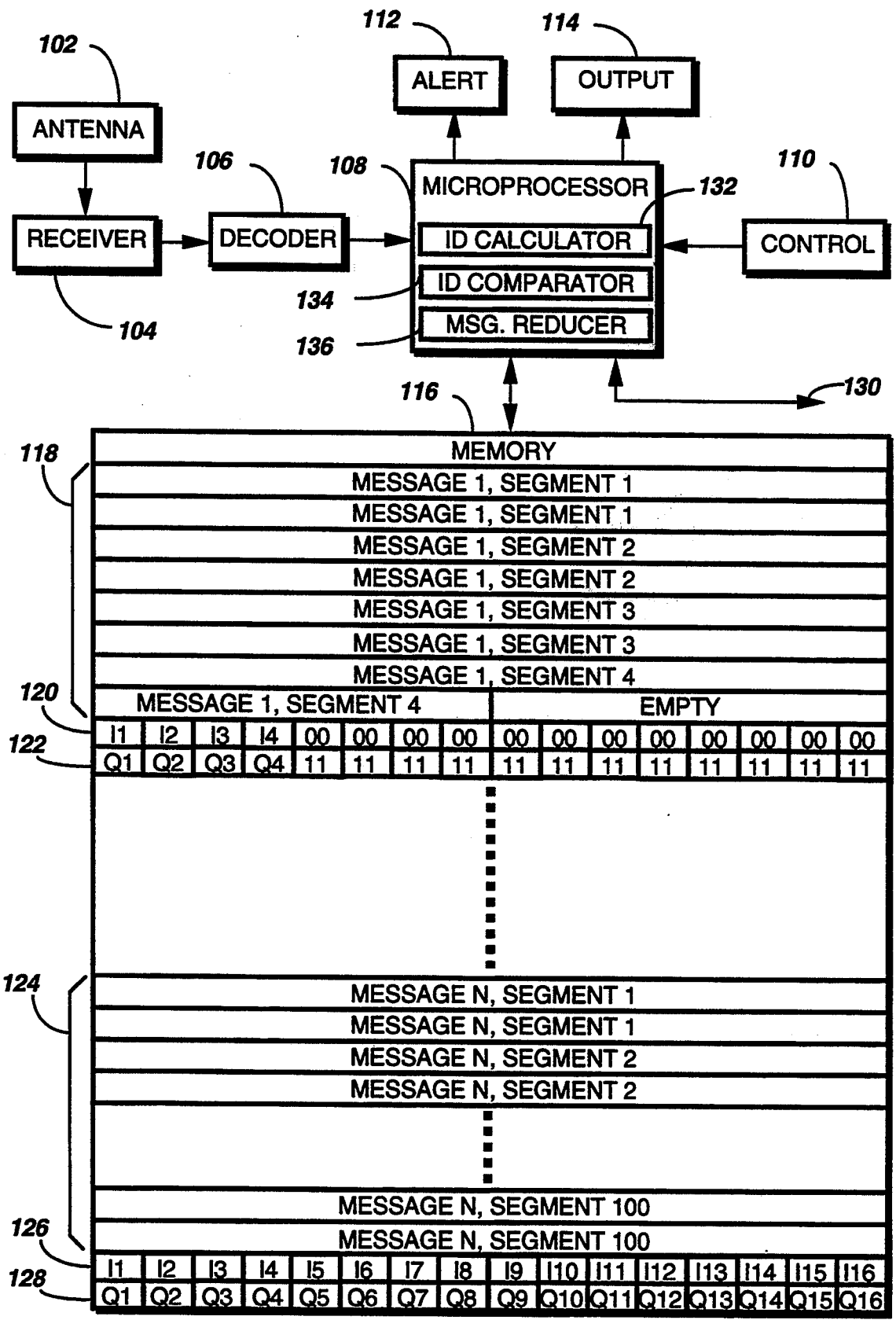
FIG. 1 is a block diagram of a selective call receiver comprising an apparatus for detecting duplicate data messages in accordance with the preferred embodiment of the present invention.

Referring to FIG. 1, a block diagram of a selective call receiver 100 comprising an apparatus for detecting duplicate data messages in accordance with the preferred embodiment of the present invention shows an antenna 102 for accepting RF signals comprising information. The antenna 102 is coupled to a receiver 104 for receiving the RF signals accepted. A decoder 106 is coupled to the receiver 104 for decoding the information received. A microprocessor 108 receives the decoded information from the decoder 106 and processes the information to recover messages. An alert device 112 provides an audible or tactile alert to the user when the microprocessor 108 has a message ready for presentation. An output device 114 comprises a visual display or a speaker, the output device 114 also being controlled by the microprocessor 108. A control section 110 comprises user accessible interfaces for allowing the user to command the microprocessor 108 to perform selective call receiver operations well known to those skilled in the art, and typically includes control switches such as an on/off control button, a function control, and so forth.

The microprocessor 108 is coupled to and controls a memory 116 for storing and recalling at least one message segment 118, 124 of up to eight bytes (sixty-four bits) in length for each of the messages received, along with a corresponding thirty-two-bit identifier 120, 126 for each of the messages received and a corresponding thirty-two-bit quality measure 122, 128 for each message received. Each identifier 120, 126 comprises up to sixteen calculated identifier portions I1, I2, I3, etc., the identifier portion comprising a two-bit value calculated from the at least one message segment 118, 124 of the corresponding message. Each quality measure 122, 128 comprises up to sixteen derived quality measure portions Q1, Q2, Q3, etc., the quality measure portion comprising a two-bit value derived from the at least one message segment 118, 124 of the corresponding message. The microprocessor 108 includes three processor elements, comprising an identifier calculator 132, an identifier comparator 134, and a message reducer 136. The identifier calculator 132 forms an identifier 120, 126 for a data message received and an identifier 120, 126 for a selected one of a plurality of stored data messages. Each identifier 120, 126 comprises a plurality of bits generated from at least one characteristic value calculated from at least one portion of the data message received and from at least one corresponding portion of the selected one of the plurality of stored data messages. The identifier comparator 134 compares the two identifiers 120, 126. The message reducer 136 reduces the message received and the selected one of the plurality of stored data messages to a single message, the two identifiers 120, 126 comprising substantially equivalent entireties.

A message comprising sixteen or fewer message segments 118 generates one two-bit identifier portion of the identifier 122 for each of the message segments 118, and one two-bit quality measure portion of the quality measure 122 for each of the message segments 118. A message comprising more than sixteen message segments 124 generates a maximum of sixteen two-bit identifier portions of the identifier 126 and a maximum of sixteen two-bit quality measure portions of the quality measure 128 for the totality of the message segments 124. In the latter case, the identifier portion and the quality measure portion is a composite value calculated from a plurality of message segments 124, as will be described in greater detail herein below.

Also coupled to the microprocessor 108 is a communications bus 130. The bus 130 is for providing data communications between the microprocessor 108 and an external device such as a personal computer when the communications bus 130 is coupled to the external device.

Figure 2:
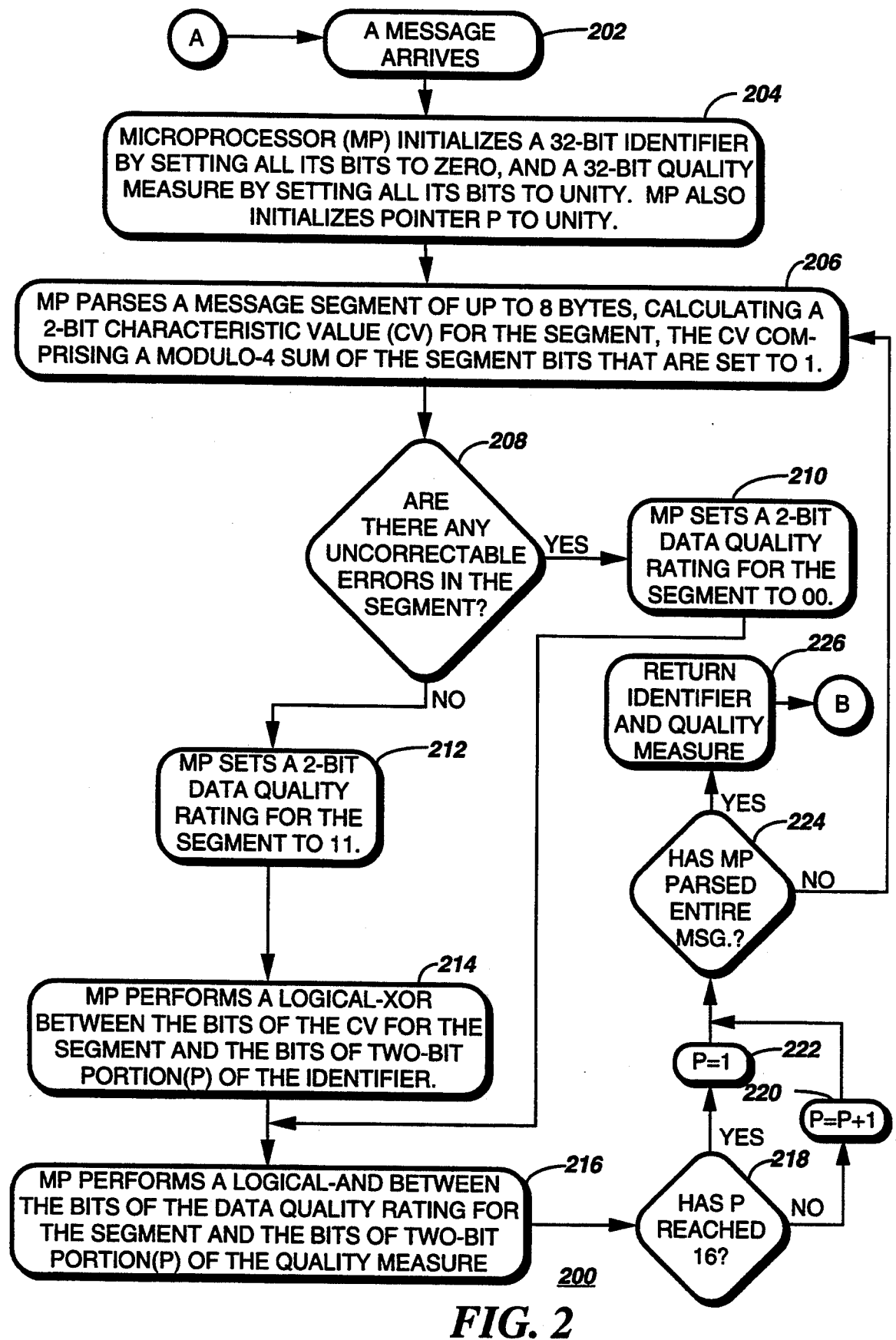
FIG. 2 is a flow chart of a subroutine for creating an identifier and a quality measure for identifying duplicate data messages in accordance with the preferred embodiment of the present invention.

Referring to FIG. 2, a flow chart 200 of a subroutine for creating an identifier and a quality measure for identifying duplicate data messages in accordance with the preferred embodiment of the present invention begins with the arrival 202 of data comprising a message. Next, the microprocessor 108 (FIG. 1) initializes 204 an available one of the thirty-two-bit identifiers 120, 126 (FIG. 1) by setting all thirty-two bits to zero. The microprocessor 108 further initializes an available one of the thirty-two bit quality measures 122, 128 (FIG. 1) by setting all thirty-two bits to unity. An internal pointer P that the microprocessor 108 will use to keep track of operations is also initialized to unity in step 204.

Having completed initialization of data, the microprocessor 108 (FIG. 1) parses 206 the Pth message segment 118, 124 (FIG. 1) of eight bytes of the message (less than eight bytes if fewer than eight unparsed bytes remain in the message) and calculates a two-bit characteristic value for the Pth message segment 118, 124. The characteristic value is calculated as a modulo-4 sum of the bits of the Pth message segment 118, 124 that are set to unity. Next, the microprocessor 108 checks 208 to determine if the Pth message segment 118, 124 contains any uncorrectable errors. If there are uncorrectable errors, the microprocessor 108 sets a two-bit data quality rating for the Pth message segment 118, 124 to zero-zero and then continues to step 216.

If, on the other hand, there are no uncorrectable errors, the microprocessor 108 (FIG. 1) sets the two-bit data quality rating for the Pth message segment 118, 124 (FIG. 1) to one-one, and continues to step 214. In step 214 the microprocessor 108 performs a logical exclusive-or between the bits of the two-bit characteristic value and the bits of the Pth two-bit portion of the identifier. Next, the microprocessor 108 performs a logical-and between the bits of the data quality rating determined in either step 210 or 212 and the bits of the Pth portion of the quality measure 122, 128 (FIG. 1).

The microprocessor 108 (FIG. 1) checks 218 to determine whether the pointer P has reaches a value of sixteen. If not, the microprocessor 108 increments 220 P by a count of one. If, on the other hand, P has reached sixteen, then the microprocessor 108 resets 222 P to a value of unity. Next the microprocessor 108 checks 224 to determine whether it has parsed the entire message. If so, the microprocessor 108 returns 226 the computed identifier and quality measure as results of the subroutine. If, on the other hand, the microprocessor 108 has not parsed the entire message, then the microprocessor 108 returns to step 206 to parse a next message segment.

Figure 3:
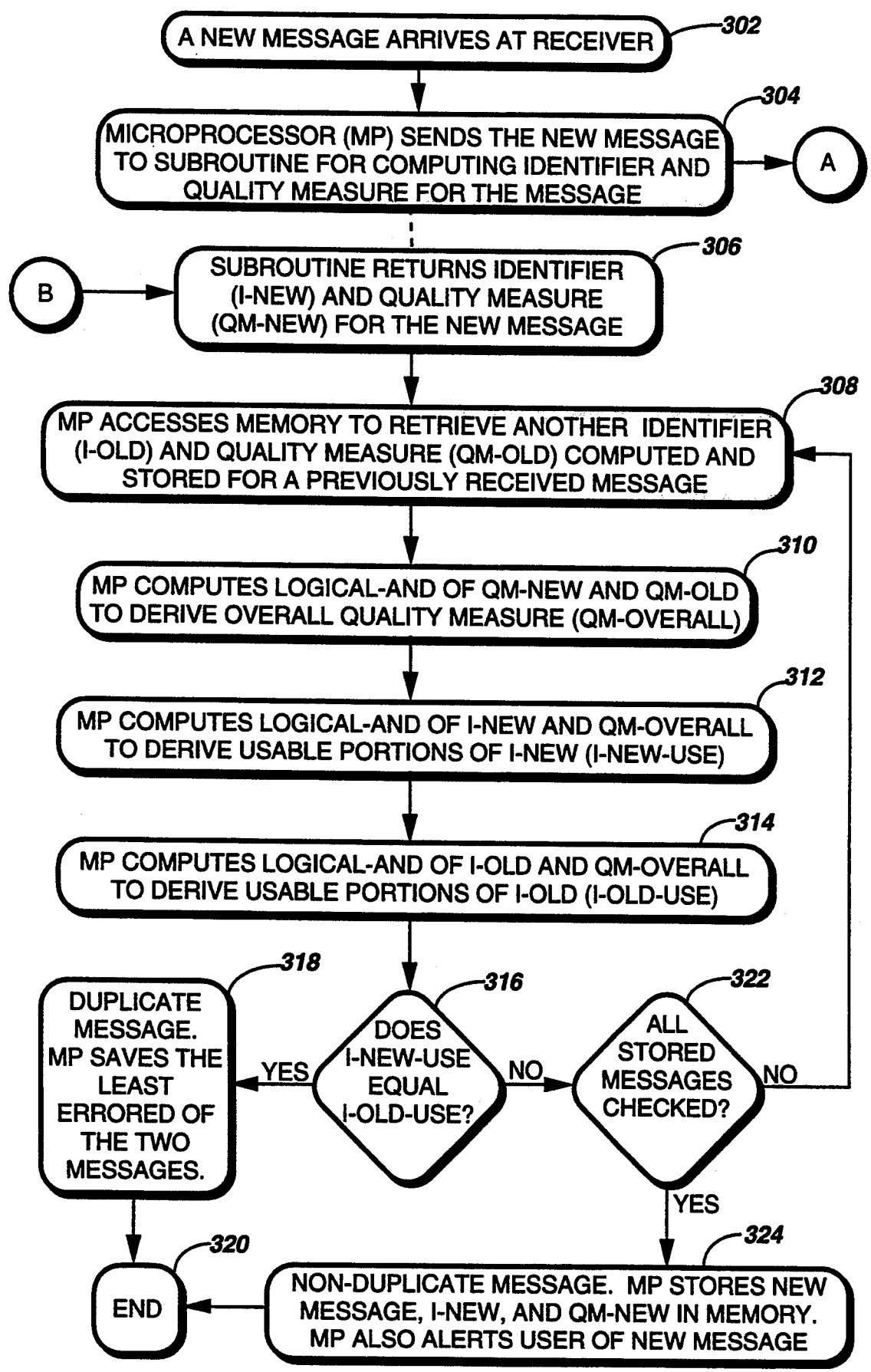
FIG. 3 is a flow chart of a method of detecting and eliminating duplicate data messages in accordance with the preferred embodiment of the present invention.

With reference to FIG. 3, a flow chart of a method of detecting and eliminating duplicate data messages in accordance with the preferred embodiment of the present invention begins with the receipt 302 of a new message at the receiver 100 (FIG. 1). In response, the microprocessor 108 (FIG. 1) sends 304 the new message to the subroutine described by the flow chart 200 (FIG. 2) for calculation of a value for the identifier 120, 126 (FIG. 1) and a value for the quality measure 122, 128 (FIG. 1) for the new message. Subsequently, the subroutine returns 306 the value for the identifier 120, 126 (the value defined herein as I-NEW) and the value for the quality measure 122, 128 (the value defined herein as QM-NEW) for the new message.

Next, the microprocessor 108 (FIG. 1) accesses 308 the memory 116 (FIG. 1) to retrieve another value (defined herein as I-OLD) for the identifier 120, 126 (FIG. 1) and corresponding value (defined herein as QM-OLD) for the quality measure 122, 128 (FIG. 1) that were computed and stored for a previously received message. Next, the microprocessor 108 computes 310 the logical-and of the bits of QM-NEW and QM-OLD to derive an overall quality measure (defined herein as QM-OVERALL). Then the microprocessor 108 computes 312 the logical-and of the bits of I-NEW and QM-OVERALL to derive a value from the usable portions of I-NEW (the value defined herein as I-NEW-USE). The term "usable portions" as used herein refers to those portions having positions wherein QM-OVERALL shows that the corresponding portions of both I-NEW and I-OLD were calculated from totally error-free message segments. This is followed by the microprocessor's 108 computing 314 the logical-and of I-OLD and QM-OVERALL to derive a value from the usable portions of I-OLD (the value defined herein as I-OLD-USE).

Next, the microprocessor 108 (FIG. 1) checks 316 to see if I-NEW-USE and I-OLD-USE are equal to one another. If so, the new message is a duplicate of the previously received message corresponding to I-OLD and QM-OLD, and the microprocessor 108 thus saves 318 the least errored of the two messages, discards the most errored of the two, and ends 320 the process.

If, on the other hand, in step 316 the microprocessor 108 (FIG. 1) finds that I-NEW-USE and I-OLD-USE are not equal to one another, then the microprocessor 108 tests 322 to see if the identifiers for all stored messages have been checked for duplicate status. If so, the new message is not a duplicate of any of the previously stored messages, and the microprocessor 108 stores the new message, along with I-NEW and QM-NEW in the memory 116 (FIG. 1), and then ends 320 the process. If, on the other hand, step 322 shows that all stored messages have not yet been checked, then the microprocessor 108 returns to step 308 to retrieve another set of values for the identifier 120, 126 (FIG. 1) and the quality measure 122, 128 (FIG. 1) for comparison.

Thus, the present invention provides a better duplicate message identification scheme than is provided by conventional methods. The present invention comprises a duplicate message identification scheme that is not computationally intensive and that does not require the receiver to store error information whose volume increases without limit in proportion to message length. Consequently, the present invention advantageously provides for the detection and elimination of duplicate messages while requiring only a fraction of the processing power and memory required by conventional methods. The result is increased message storage capacity and better battery life in a portable receiver—two important advantages. Also, the present invention does not require the transmission of additional information, e.g., headers, through the communication system. As a result, communications that use the present invention can transmit user data at a higher rate than conventional systems whose effective user data rate is slowed by the transmission of headers for message identification. Furthermore, the present invention comprises a duplicate message identification scheme that intelligently detects duplicate messages based on the actual message contents, regardless of how the duplicate messages were generated. Consequently, the present invention advantageously can detect and eliminate duplicate messages that are created by multiple entry of the same message by a sender, as well as duplicate messages resent by the communication system itself for added message reliability.

Figure 4:
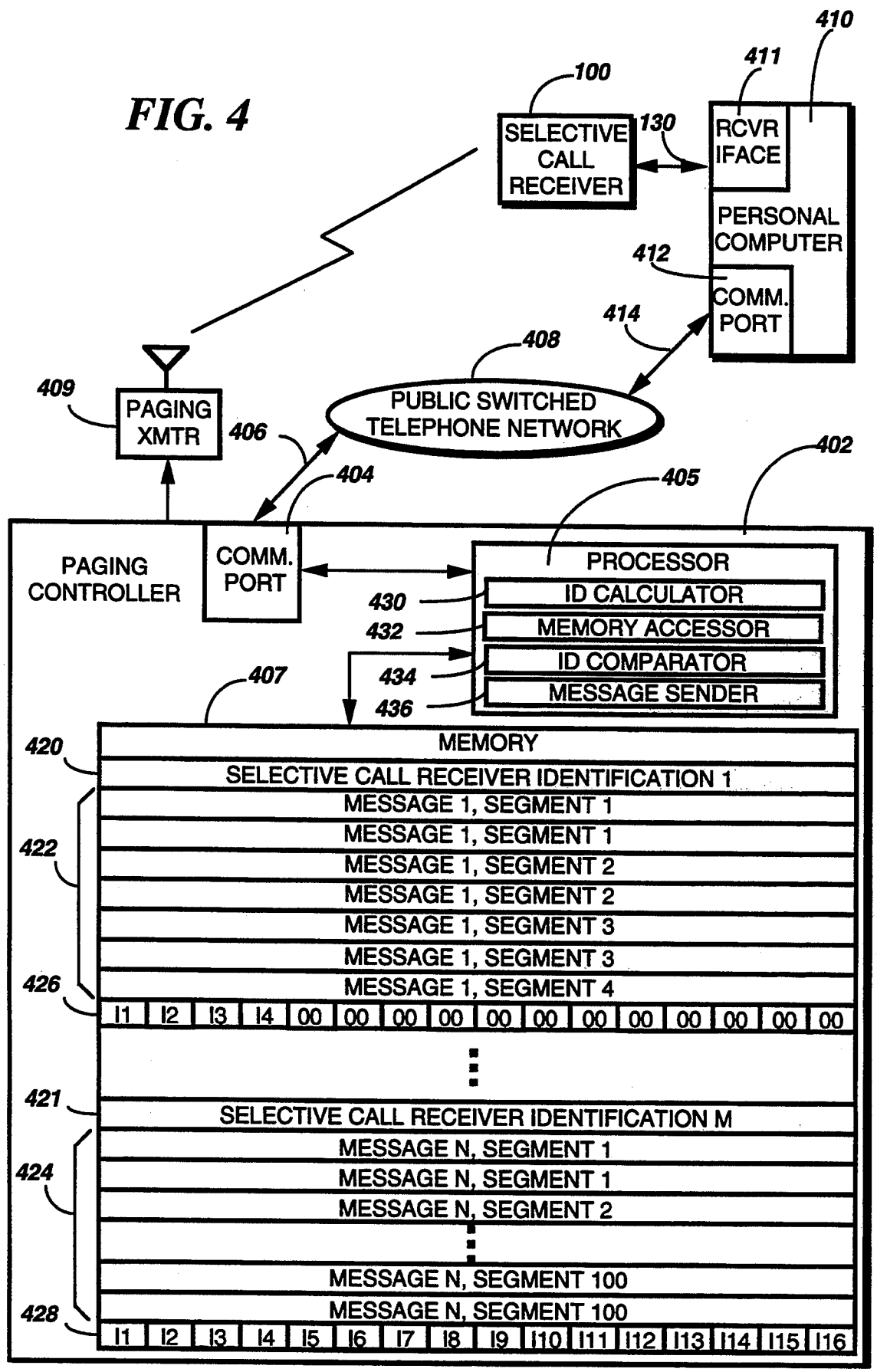
FIG. 4 is a system block diagram of apparatus for requesting and obtaining a retransmission of a duplicate message in accordance with the preferred embodiment of the present invention.

Referring to FIG. 4, a system block diagram of apparatus for requesting and obtaining a retransmission of a duplicate message in accordance with the preferred embodiment of the present invention is shown. The apparatus comprises a paging controller 402 having at least one communications port 404 coupled to a Public Switched Telephone Network (PSTN) 408 by at least one telephone line 406 for communicating through the PSTN 408. The paging controller 402 comprises a processor 405 coupled to the communications port 404 for controlling and interworking with the communications port 404. The paging controller 402 further comprises a memory 407 for storing selective call receiver identifications 420, 421, along with message segments 422, 424 sent to each so identified selective call receiver 100 (FIG. 1), and values calculated for sent message identifiers 426, 428 in accordance with the preferred embodiment of the present invention. The processor 405 includes four processor elements, comprising an identifier calculator 430, a memory accessor 432, an identifier comparator 434, and a message sender 436. The identifier calculator 430 forms in response to a transmitted data message an identifier for the transmitted data message. The identifier comprises a plurality of bits generated from at least one characteristic value calculated from at least one portion of the transmitted data message. The memory accessor 432 accesses a memory location corresponding to a selective call receiver matching the selective call receiver identification 420, 421 to retrieve a transmitted message identifier 426, 428 formed for a transmitted data message. The identifier comparator 434 compares selected portions of the retrieved transmitted message identifier 426, 428 with corresponding selected portions of a received message identifier communicated from the selective call receiver. The selected portions comprise portions corresponding to portions of the quality measure that have a data quality rating higher than a predetermined level. The message sender 436 sends to the selective call receiver a corresponding transmitted data message, the selected portions of the retrieved transmitted message identifier and the corresponding selected portions of the received message identifier being substantially equivalent to each other.

The apparatus further comprises a paging transmitter 409 coupled to the paging controller 402 for transmitting messages to the selective call receiver 100 and a personal computer 410 comprising a communications port 412 coupled by a telephone line 414 to the PSTN 408 for communicating with the paging controller 402 through the PSTN 408. The personal computer 410 has a receiver interface 411 coupled to the communications bus 130 of the selective call receiver 100 for communicating with the selective call receiver 100 in accordance with the preferred embodiment of the present invention.

Figure 5:
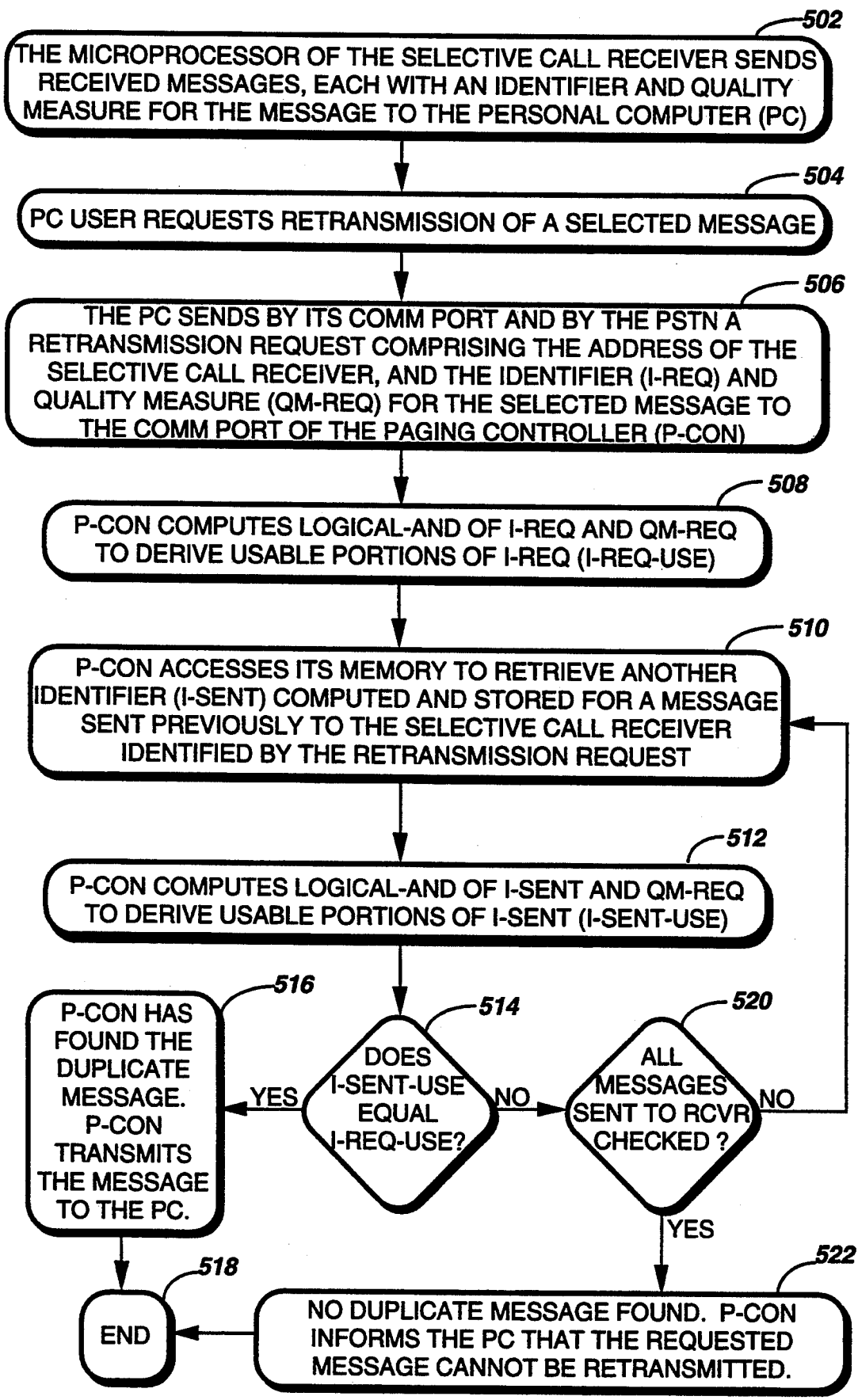
FIG. 5 is a flow chart of a method for requesting and obtaining a retransmission of a duplicate message in accordance with the preferred embodiment of the present invention.

Referring to FIG. 5, a flow chart of a method for requesting and obtaining a retransmission of a duplicate message in accordance with the preferred embodiment of the present invention begins with an interchange between the selective call receiver 100 (FIG. 1) and the personal computer 410 (FIG. 4). In step 502 in response to receiving at least one message the microprocessor 108 (FIG. 1) of the selective call receiver 100 sends to the personal computer 410 the at least one message received, each message accompanied by a corresponding set of values for the identifier 120, 126 (FIG. 1) and for the quality measure 122, 128 (FIG. 1), the set of values being calculated in accordance with the present invention. Subsequently, a user requests 504 a retransmission of a selected message. The retransmission may be desired, for example, because the selected message was received with several uncorrectable errors.

In response to the user's request, the software of the personal computer 410 sends 506 a retransmission request by the communications port 412 (FIG. 4) through the PSTN 408 (FIG. 4) to the communications port 404 (FIG. 4) of the paging controller 402 (FIG. 4). The retransmission request comprises an identification of the selective call receiver, and the set of values for the identifier 120, 126 (FIG. 1) (the identifier value defined herein as I-REQ) and quality measure 122, 128 (FIG. 1) (the quality measure value defined herein as QM-REQ) corresponding to the selected message.

Next, the processor 405 (FIG. 4) of the paging controller 402 (FIG. 4) computes 508 the logical-and of corresponding bits of I-REQ and QM-REQ to derive a value from usable, i.e., error-free, portions of I-REQ (the value defined herein as I-REQ-USE). Then the processor 405 accesses 510 memory locations in the memory 407 (FIG. 4) corresponding to the selective call receiver identification 420, 421 (FIG. 4) identified in the retransmission request. The access is for retrieving a stored value for one of the sent message identifiers 426, 428 (FIG. 4) computed earlier in accordance with the steps of the flow chart 200 (FIG. 2) for a message sent to the selective call receiver 100 (FIG. 1) (the retrieved value defined herein as I-SENT).

Next, the processor 405 (FIG. 4) of the paging controller 402 (FIG. 4) computes 512 the logical-and of I-SENT and QM-REQ to derive a value from usable portions of I-SENT (the value defined herein as I-SENT-USE). At this point the processor 405 checks 514 to see whether I-SENT-USE is equal to I-REQ-USE. If so, the processor 405 has found the identifier value corresponding to the requested duplicate message, and now sends 516 the corresponding duplicate message to the personal computer 410 (FIG. 4) through the communications port 404 (FIG. 4) in response to the retransmission request, and then ends 518 the process.

If, on the other hand, the processor 405 (FIG. 4) determines in step 514 that I-SENT-USE is not equal to I-REQ-USE, then the processor 405 tests 520 whether all sent message identifiers 426, 428 (FIG. 4) for messages sent to the receiver 100 identified in the retransmission request have been checked for duplicate status. If not, the processor 405 returns to step 510 to retrieve and check another identifier.

If, however, the processor 405 (FIG. 4) determines in step 520 that all sent message identifiers 426, 428 (FIG. 4) for messages sent to the receiver 100 have been checked, then the processor 405 informs 522 the personal computer 410 (FIG. 4) that the requested message cannot be retransmitted and then ends 518 the process.

Thus, the present invention comprises not only a better method of detecting and eliminating duplicate messages as described earlier herein, but also provides a duplicate message identification method for identifying messages for retransmission in a retransmission request. The present invention does not depend on a conventional header for identifying a message, but instead bases message identification upon calculated characteristic values of those portions of the message that have been received without uncorrectable errors. Thus, the present invention is a preferred choice for use in requesting and obtaining retransmission of messages received with multiple uncorrectable errors, which can render inoperable a method that uses headers for message identification.

What is claimed is:

1. A method of determining whether first and second data messages are duplicates of one another in a communication system comprising a transmitter for sending the first and second data messages and a receiver for receiving the first and second data messages, wherein the method does not require transmission of a message identification header from the transmitter to the receiver, the method comprising the steps of:

(a) calculating from the first and second data messages a corresponding pair of first and second message identifiers comprising a plurality of bits generated from at least one corresponding pair of first and second message characteristic values, the at least one corresponding pair of first and second message characteristic values calculated from at least one portion of the first data message and a corresponding at least one portion of the second data message; and (b) comparing the pair of first and second message identifiers calculated in step (a) to determine whether the first and second message identifiers are substantially equivalent to each other, substantially equivalent identifiers being indicative that the first and second data messages are duplicates of one another.

2. The method in accordance with claim 1, further comprising the steps of:

(c) subdividing the first and second data messages into at least one corresponding pair of first and second message segments having a maximum length;

(d) calculating at least one pair of corresponding first and second message characteristic values from the at least one corresponding pair of first and second message segments, each of the first and second message characteristic values comprising bits and having a predetermined bit length; and (e) determining at least one pair of corresponding first and second message data quality ratings for each of the at least one pair of first and second message segments, each of the first and second message data quality ratings comprising bits and having a predetermined bit length.

3. The method in accordance with claim 2, wherein step (d) comprises computing separately from each message segment of the at least one corresponding pair of first and second message segments a modulo-n sum of the bits that have a bit value equal to a logical-one in the message segment.

4. The method in accordance with claim 2, wherein step (a) comprises the steps of:

(f) assigning a predetermined initial value to the first and second message identifiers comprising corresponding pairs of a plurality of first and second message identifier portions, each identifier portion comprising bits, the identifier portion having a predetermined position within the identifier and having a bit length equal to the predetermined bit length of each of the first and second message characteristic values determined in step (d);

(g) combining each of the at least one pair of first and second message characteristic values calculated in step (d) with corresponding pairs of the plurality of first and second message identifier portions to form a corresponding pair of resultant combined values, the combining being done in a predetermined order; and (h) replacing each of the pairs of the plurality of first and second message identifier portions with the corresponding pair of resultant combined values formed in step (g) to derive first and second message identifier intermediate values.

5. The method in accordance with claim 4,
wherein the predetermined initial value assigned to the first and second message identifiers in step (f) comprises all-zero bit values, and wherein each of the pairs of resultant combined values formed in step (g) comprises a logical exclusive-or of the corresponding bits of each message characteristic value from each of the at least one pair of first and second message characteristic values calculated in step (d) and the corresponding message identifier portion from the pairs of the plurality of first and second message identifier portions.

6. The method in accordance with claim 4, wherein step (b) further comprises the steps of:

(i) assigning a predetermined initial value to first and second message quality measures comprising corresponding pairs of a plurality of first and second message quality measure portions, each quality measure portion comprising bits, the quality measure portion having a predetermined position within the quality measure and having a bit length equal to the bit length of each of the first and second message data quality ratings determined in step (e);

(j) combining each of the at least one pair of first and second message data quality ratings determined in step (e) with corresponding pairs of the plurality of first and second message quality measure portions to form a corresponding pair of resultant combined values, the combining being done in a predetermined order; and (k) replacing each of the pairs of the plurality of first and second message quality measure portions with the corresponding pair of resultant combined values formed in step (j) to derive first and second message final values for the first and second message quality measures.

7. The method in accordance with claim 6,
wherein the predetermined initial value assigned to the first and second quality measures in step (i) comprises all logical-one bit values, and wherein each data quality rating of the at least one pair of corresponding first and second message data quality ratings determined in step (e) comprises all logical-one bit values for a corresponding message segment having no uncorrectable errors, and wherein each data quality rating of the at least one pair of corresponding first and second message data quality ratings determined in step (e) comprises all logical-zero bit values for a corresponding message segment having at least one uncorrectable error, and wherein the predetermined bit length of each of the data quality ratings is the same as the predetermined bit length of each of the first and second message characteristic values calculated in step (d), and wherein each resultant combined value of the pair of resultant combined values formed in step (j) comprises a logical-and of corresponding bits of each data quality rating from the at least one pair of first and second message data quality ratings determined in step (e) and a corresponding quality measure portion from the corresponding pair of the plurality of first and second message quality measure portions.

8. The method in accordance with claim 6, further comprising the step of:

(l) combining the first and second message final values for the first and second message quality measures derived in step (k) to form an overall quality measure.

9. The method in accordance with claim 8, wherein the overall quality measure formed in step (l) comprises a logical-and of corresponding bits of the first and second message final values for the first and second message quality measures.

10. The method in accordance with claim 8, wherein step (b) further comprises the step of:

(m) combining the first and second message identifier intermediate values derived in step (h) with the overall quality measure formed in step (l) to form first and second message final values for the first and second message identifiers.

11. The method in accordance with claim 10, wherein each of the first and second message final values for the first and second message identifiers formed in step (m) comprises a logical-and of the corresponding bits of each of the first and second message identifier intermediate values derived in step (h) and the overall quality measure formed in step (l).

12. A method of detecting and eliminating duplicate data messages in a communication system comprising a transmitter for sending a data message and a receiver for receiving the data message and for storing a plurality of stored data messages, wherein the method does not require transmission of a message identification header from the transmitter to the receiver, the method comprising in the receiver the steps of:

(a) selecting one of the plurality of stored data messages to be defined as a first data message;

(b) calculating from the first data message and from a second data message received a corresponding pair of first and second message identifiers comprising a plurality of bits generated from at least one corresponding pair of first and second message characteristic values, the at least one corresponding pair of first and second message characteristic values calculated from at least one portion of the first data message and a corresponding at least one portion of the second data message; and (c) comparing the pair of first and second message identifiers calculated in step (b) to determine whether the first and second message identifiers are substantially equivalent to each other, substantially equivalent identifiers being indicative that the first and second data messages are duplicates of one another;

(d) repeating steps (a), (b), and (c) until all of the plurality of stored data messages have been selected and compared, in response to the two identifiers compared in step (c) being determined to be different from each other; and (e) reducing the first and second messages to a single message, in response to the two identifiers compared in step (c) being determined to be substantially equivalent to each other.

13. The method according to claim 12, further comprising the steps of:

(f) subdividing the first and second data messages into at least one corresponding pair of first and second message segments having a maximum length;

(g) calculating at least one pair of corresponding first and second message characteristic values from the at least one corresponding pair of first and second message segments, each of the first and second message characteristic values comprising bits and having a predetermined bit length; and (h) determining at least one pair of corresponding first and second message data quality ratings for each of the at least one pair of first and second message segments, each of the first and second message data quality ratings comprising bits and having a predetermined bit length.

14. The method in accordance with claim 13, wherein step (b) comprises the steps of:

(i) assigning a predetermined initial value to the first and second message identifiers comprising corresponding pairs of a plurality of first and second message identifier portions, each identifier portion comprising bits, the identifier portion having a predetermined position within the identifier and having a bit length equal to the predetermined bit length of each of the first and second message characteristic values calculated in step (g);

(j) combining each of the at least one pair of first and second message characteristic values calculated in step (g) with corresponding pairs of the plurality of first and second message identifier portions to form a corresponding pair of resultant combined values, the combining being done in a predetermined order; and (k) replacing each of the pairs of the plurality of first and second message identifier portions with the corresponding pair of resultant combined values formed in step (j) to derive first and second message identifier intermediate values.

15. The method in accordance with claim 14, wherein step (c) comprises the steps of:

(l) assigning a predetermined initial value to first and second message quality measures comprising corresponding pairs of a plurality of first and second message quality measure portions, each quality measure portion comprising bits, the quality measure portion having a predetermined position within the quality measure and having a bit length equal to the bit length of each of the first and second message data quality ratings determined in step (h);

(m) combining each of the at least one pair of first and second message data quality ratings determined in step (h) with corresponding pairs of the plurality of first and second message quality measure portions to form a corresponding pair of resultant combined values, the combining being done in a predetermined order;

(n) replacing each of the pairs of the plurality of first and second message quality measure portions with the corresponding pair of resultant combined values formed in step (m) to derive first and second message final values for the first and second message quality measures; and (o) combining the first and second message final values for the first and second message quality measures derived in step (n) to form an overall quality measure.

16. The method in accordance with claim 15, wherein step (c) further comprises the step of:

(p) combining the first and second message identifier intermediate values derived in step (k) with the overall quality measure formed in step (o) to form first and second message final values for the first and second message identifiers.

17. A method of requesting and obtaining a retransmission of a duplicate of a received data message in a communication system comprising a controller and transmitter for generating and transmitting the received data message, wherein the controller comprises memory means for storing a plurality of sent data messages and corresponding identification information calculated from each sent data message, the communication system further comprising a receiver for receiving the received data message and for providing information to the controller for requesting the retransmission, wherein the method does not require transmission of a message identification header from the transmitter to the receiver, the method comprising:

in the receiver the steps of:
(a) calculating for the received data message a received message identifier comprising a plurality of bits generated from at least one characteristic value calculated from at least one portion of the received data message;
(b) calculating for the received data message a quality measure comprising a plurality of bits generated from at least one data quality rating calculated from the at least one portion of the received data message; and
(c) providing the received message identifier and the quality measure to the controller in a retransmission request; and in the controller the steps of:
(d) receiving the received message identifier and the quality measure in the retransmission request provided by the receiver in step (c);
(e) accessing the memory means to recover a sent message identifier calculated for a sent data message sent previously to the receiver, wherein the sent message identifier comprises a plurality of bits generated from at least one characteristic value calculated from at least one portion of the sent data message;
(f) comparing selected portions of the sent message identifier accessed in step (e) with corresponding selected portions of the received message identifier received in step (d), the quality measure received in step (d) indicating that the selected portions of the received message identifier were calculated from portions of the received data message having a data quality rating higher than a predetermined level;
(g) repeating steps (e) and (f) until all sent message identifiers contained in the memory means for data messages sent previously to the receiver have been accessed and compared, in response to the selected portions of the sent message identifier and the corresponding selected portions of the received message identifier being determined to be different from each other; and
(h) sending to the receiver a corresponding data message sent previously, in response to the selected portions of the sent message identifier and the corresponding selected portions of the received message identifier being determined to be substantially equivalent to each other.

18. An apparatus in a receiver for determining whether first and second data messages are duplicates of one another in a communication system comprising a transmitter for sending the first and second data messages and the receiver for receiving the first and second data messages, wherein no message identification header is required to be transmitted from the transmitter to the receiver, the apparatus comprising:

first processor means for calculating from the first and second data messages a corresponding pair of first and second message identifiers comprising a plurality of bits generated from at least one corresponding pair of first and second message characteristic values, the at least one corresponding pair of first and second message characteristic values calculated from at least one portion of the first data message and a corresponding at least one portion of the second data message;
second processor means coupled to the first processor means for comparing the pair of first and second message identifiers to determine whether the first and second message identifiers are substantially equivalent to each other, substantially equivalent identifiers being indicative that the first and second data messages are duplicates of one another; and
memory means coupled to the first and second processor means for storing at least one pair of first and second data messages and at least one corresponding pair of first and second message identifiers.

19. A selective call receiver comprising:
a receiver for receiving radio frequency (RF) signals comprising information and for demodulating the RF signals to derive the information, wherein the information is not required to include a message identification header;
a decoder coupled to the receiver for decoding the received information and obtaining data messages therefrom;
a microprocessor coupled to the decoder for accepting the data messages and for controlling the selective call receiver;
a memory coupled to the microprocessor for storing the data messages and operating system software; and
apparatus for detecting and eliminating duplicate messages, the apparatus comprising:
a first processor element coupled to the memory for calculating an identifier for a data message received and an identifier for a selected one of a plurality of stored data messages, each identifier comprising a plurality of bits generated from at least one characteristic value calculated from at least one portion of the data message received and from at least one corresponding portion of the selected one of the plurality of stored data messages;
a second processor element coupled to the first processor element for comparing the two identifiers; and
a third processor element coupled to the second processor element for reducing the message received and the selected one of the plurality of stored data messages to a single message, in response to the two identifiers comprising substantially equivalent entireties.

20. A controller for responding to a request for a retransmission of a duplicate of a received data message in a communication system comprising the controller for generating the received data message and a transmitter for transmitting the received data message, the communication system further comprising a selective call receiver for receiving the received data message and for providing information for requesting the retransmission, wherein no message identification header is required to be transmitted from the transmitter to the selective call receiver, the controller comprising:

a processor for controlling the generation and transmission of a data message;

a first processor element coupled to the processor for calculating in response to a transmitted data message an identifier for the transmitted data message, the identifier comprising a plurality of bits generated from at least one characteristic value calculated from at least one portion of the transmitted data message;

a memory having a plurality of memory locations, each corresponding to a selective call receiver identification corresponding to a selective call receiver having been sent a transmitted data message, the plurality of memory locations coupled to the processor for storing the transmitted data message and the corresponding transmitted message identifier;

a communications port coupled to the processor for receiving a selective call receiver identification, a received message identifier, and a quality measure in a request for a retransmission;

a second processor element coupled to the memory for accessing a memory location corresponding to a selective call receiver matching the selective call receiver identification to retrieve a transmitted message identifier calculated for a transmitted data message;

a third processor element coupled to the second processor element for comparing selected portions of the retrieved transmitted message identifier with corresponding selected portions of the received message identifier, the selected portions comprising portions corresponding to portions of the quality measure that have a data quality rating higher than a predetermined level; and a fourth processor element coupled to the third processor element and to the communications port for sending to the selective call receiver a corresponding transmitted data message, in response to the selected portions of the retrieved transmitted message identifier and the corresponding selected portions of the received message identifier being substantially equivalent to each other.

* * * * *